(12) United States Patent
Wang et al.

(10) Patent No.: US 9,847,860 B2
(45) Date of Patent: Dec. 19, 2017

(54) COMMUNICATION MECHANISM USING DEMODULATION REFERENCE SIGNAL BASED COMMUNICATION MODE

(75) Inventors: Xiaoyi Wang, Beijing (CN); Peter Skov, Beijing (CN); Jingxiu Liu, Beijing (CN); DeShan Miao, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/387,258

(22) PCT Filed: Mar. 23, 2012

(86) PCT No.: PCT/CN2012/072978
§ 371 (c)(1),
(2), (4) Date: Sep. 23, 2014

(87) PCT Pub. No.: WO2013/139042
PCT Pub. Date: Sep. 26, 2013

(65) Prior Publication Data
US 2015/0103765 A1 Apr. 16, 2015

(51) Int. Cl.
*H04B 7/00* (2006.01)
*H03M 13/09* (2006.01)
(Continued)

(52) U.S. Cl.
CPC .......... *H04L 5/0048* (2013.01); *H04B 7/024* (2013.01); *H04L 5/0092* (2013.01);
(Continued)

(58) Field of Classification Search
CPC ....... H04L 5/00; H04L 5/0092; H04L 5/0048; H04L 5/0035; H04L 5/0023;
(Continued)

(56) References Cited

U.S. PATENT DOCUMENTS

| 7,730,387 B2 * | 6/2010 | Yamazaki | ............... H04L 9/065 714/807 |
| 2009/0136034 A1 * | 5/2009 | Gaal | ....................... G06F 7/584 380/268 |

(Continued)

FOREIGN PATENT DOCUMENTS

| CN | 102055519 A | 5/2011 |
| CN | 102082595 A | 6/2011 |

(Continued)

OTHER PUBLICATIONS

3GPP TR 36.819 V11.1.0 (Dec. 2011), "$3^{rd}$ Generation Partnership Project; Technical specification Group Radio Access network; Coordinated multi-point operation for LTE physical layer aspects (Release 11)", 69 pgs.

(Continued)

*Primary Examiner* — Edan Orgad
*Assistant Examiner* — Vanneilian Lalchinthang
(74) *Attorney, Agent, or Firm* — Harrington & Smith

(57) ABSTRACT

There is provided a mechanism for conducting a communication between at least one communication network control element such as an eNB and at least one communication element such as a UE wherein a DM RS based communication mode is used. DMRS (scrambling) sequences are generated wherein each DMRS sequence includes a set of calculation parameters being specific for the respective DMRS sequence, wherein the set of calculation parameters is configurable by the eNB during communication. For initializing each of the at least one scrambling sequence before receiving the configuration information, i.e. in an initial phase of the communication, a predetermined default value based on e.g. an UE_ID and being selectable from a set of predetermined default values is used for the set of calculation parameters in each DMRS sequence.

13 Claims, 5 Drawing Sheets

(51) Int. Cl.
   *H04L 5/00*     (2006.01)
   *H04L 27/26*    (2006.01)
   *H04B 7/024*    (2017.01)

(52) U.S. Cl.
   CPC ........ *H04L 27/2613* (2013.01); *H04L 5/0023* (2013.01); *H04L 5/0035* (2013.01)

(58) Field of Classification Search
   CPC ....... H04L 27/2613; H04B 7/02; H04B 7/024; H04J 13/10; H03M 13/15
   USPC .......................................................... 370/329
   See application file for complete search history.

(56) References Cited

U.S. PATENT DOCUMENTS

| | | | | |
|---|---|---|---|---|
| 2009/0249027 | A1* | 10/2009 | Kim | H04L 25/03866 712/5 |
| 2010/0172235 | A1* | 7/2010 | Liu | H04J 11/0069 370/208 |
| 2011/0077038 | A1* | 3/2011 | Montojo | H04B 7/024 455/507 |
| 2011/0237267 | A1* | 9/2011 | Chen | H04J 11/003 455/450 |
| 2011/0267972 | A1* | 11/2011 | Yoon | H04L 5/0023 370/252 |

FOREIGN PATENT DOCUMENTS

| | | |
|---|---|---|
| CN | 102142918 A | 8/2011 |
| CN | 102170624 A | 8/2011 |
| CN | 102340382 A | 2/2012 |
| WO | WO-2012130148 A1 | 10/2012 |
| WO | WO-2013/138389 A2 | 9/2013 |

OTHER PUBLICATIONS

"Remaining details of downlink DM-RS", Intel Corporation, 3GPP TSG RAN WG1 #68bis, Ri-121520, Mar. 26-30, 2012, 3 pgs.
"Orthogonality of DM RS for MU-CoMP", Alcatel-Lucent, 3GPP TSG RAN WG1 meeting #68, R1-120497, Feb. 6-10, 2012, 2 pgs.

* cited by examiner

COMMUNICATION MECHANISM USING DEMODULATION REFERENCE SIGNAL BASED COMMUNICATION MODE

BACKGROUND OF THE INVENTION

Field of the Invention

The present invention relates to a mechanism for conducting communications by using a communication mode based on demodulation reference signals (DMRS). Specifically, the present invention is related to an apparatus, a method and a computer program product which provide a mechanism in which a demodulation reference signal based communication mode can be used on the basis of an improved DMRS sequence generation procedure, in particular (but not exclusively) in connection with multipoint transmission schemes.

Related Background Art

Prior art which is related to this technical field can e.g. be found in technical specifications according to 3GPP TR 36.819 (e.g. version 11.1.0).

The following meanings for the abbreviations used in this specification apply:
BS: base station
CoMP: coordinated multiple point transmission
DCI: downlink control information
DL: downlink
DMRS: demodulation reference signal
DRS: dedicated reference signal
eNB: evolved node B
ePDCCH: enhanced physical downlink control channel
ID: identification, identifier
LTE: Long Term Evolution
LTE-A: LTE Advanced
MIMO: multiple input multiple output
MU: multiple user
PDSCH: physical downlink shared channel
PCI: physical cell identifier
RNTI: radio network temporary identification
RRC: radio resource control
RRH: remote radio head
SU: single user
TP: transmission point
UE: user equipment
UL: uplink In the last years, an increasing extension of communication networks, e.g. of wire based communication networks, such as the Integrated Services Digital Network (ISDN), DSL, or wireless communication networks, such as the cdma2000 (code division multiple access) system, cellular 3rd generation (3G) and fourth generation (4G) communication networks like the Universal Mobile Telecommunications System (UMTS), enhanced communication networks based e.g. on LTE or LTE-A, cellular 2nd generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (Wi-MAX), took place all over the world. Various organizations, such as the 3rd Generation Partnership Project (3GPP), Telecoms & Internet converged Services & Protocols for Advanced Networks (TISPAN), the International Telecommunication Union (ITU), 3rd Generation Partnership Project 2 (3GPP2), Internet Engineering Task Force (IETF), the IEEE (Institute of Electrical and Electronics Engineers), the WiMAX Forum and the like are working on standards for telecommunication network and access environments.

Generally, for properly establishing and handling a communication connection between terminal devices or communication elements such as a user equipment (UE) and another communication element or user equipment, a database, a server, etc., one or more intermediate network elements such as communication network control elements, support nodes or service nodes are involved which may belong to different communication network.

Current communication networks are adapted to be capable of MIMO communications, wherein both SU-MIMO and MU-MIMO scenarios are to be covered. MIMO is seen as a key technique in modern cellular communication systems such as LTE or LTE-A based networks and refers to the use of multiple antennas at both the transmitter and receiver sides. That is, both base stations like eNBs and terminal devices like UEs are equipped with multiple antenna elements intended to be used in transmission and reception to provide MIMO capabilities in both UL and DL.

In order to be capable of simultaneously providing a large number of different users with very high data rates, different communication schemes are considered. One example is the so-called coordinated multipoint (CoMP) transmission and reception scheme considered e.g. for LTE-A Rel. 11 as a tool to improve the coverage of high data rates, the cell-edge throughput, and also to increase system throughput. CoMP refers to a system where several geographically distributed antenna nodes cooperate with the aim of improving the performance of the users served in a common cooperation area. CoMP in the context of LTE-Advanced involves several possible coordinating schemes among access points, such as coordinated beamforming/scheduling where user data are transmitted only from a single cell, and joint processing techniques which require multiple nodes to transmit user data to the UE. Two approaches are being considered: joint transmission, which requires multi-user linear precoding, and dynamic cell selection, where data are transmitted from only one cell that is dynamically selected.

The following scenarios are selected for the evaluation of DL and UL COMP:
Scenario 1: Homogeneous network with intra-site CoMP
Scenario 2: Homogeneous network with high Tx power RRHs
Scenario 3: Heterogeneous network with low power RRHs within the macrocell coverage where the transmission/reception points created by the RRHs have different cell IDs as the macro cell
Scenario 4: Heterogeneous network with low power RRHs within the macrocell coverage where the transmission/reception points created by the RRHs have the same cell IDs as the macro cell DL channels, such as a PDSCH of a communication is associated with one or more reference signals which are precoded in the same way as data to be transmitted so as to enable a terminal device to estimate communication conditions. A corresponding reference signal is, for example, a UE specific DMRS which is transmitted by using the same precoder.

DMRS is introduced, for example, in 3GPP LTE based communication networks to enable a UE specific demodulation. That is, DMRS is designed to be UE specific to facilitate fine granular precoding on the PDSCH, wherein DMRS based transmission modes have become important transmission modes in several network implementations (such as TM9 in LTE Rel. 10 networks).

However, since for the generation of DMRS scrambling sequences used in a DMRS communication mode a physical cell ID (PCI) is used, current DMRS transmission modes are not fully UE-specific.

For future communication network standards, such as for 3GPP Rel. 11, DMRS sequence usage shall be improved. For example, it is planned to initialize a scrambling sequence of DMRS e.g. for PDSCH on ports 7~14 on the basis of the following equation (1):

$$c_{init}=(\lfloor n_s/2 \rfloor+1)\cdot(2X+1)\cdot 2^{16}+n_{SCID} \qquad (1)$$

where $c_{init}$ is an initialization code of the scrambling sequence, $n_s$ is the number of the time slot, X is a calculation parameter whose value is dynamically selectable from values {x(0), x(1), ... x(N−1)} for N>1, wherein N is the number of parameters configurable for a terminal device, and $n_{SCID}$ is a number related to a serving cell identification. The values to be used for x(n) (0<=n<N) are configured by UE-specific RRC signaling from the eNB. Regarding the parameter X, it is considered that it could be determined on the basis of dynamic signaling with additional bits of DCI format or tied to a current parameter like $n_{SCID}$.

Even though with the above approach parameters for the DMRS sequence are configurable by RRC signaling from the eNB, a degree of a resulting overhead is rather high, in particular in case the eNB has to configure the parameters (such as parameter X in equation 1) for each UE.

Furthermore, when a communication connection is just initialized, e.g. when RRC is just connected, the UE does not know the DMRS sequence to be used so that a DMRS based transmission is not available in the initial phase.

SUMMARY OF THE INVENTION

It is an object of the invention to provide an improved mechanism for conducting a communication by using a DMRS based communication mode. Specifically, it is an object of the present invention to provide an apparatus, a method and a computer program product which provide a mechanism in which an improved mechanism for generating a DMRS sequence for conducting a DMRS based communication mode is provided allowing to save overhead for e.g. RRC signaling, to use DMRS based communication also in an initial phase of a communication connection.

These objects are achieved by the measures defined in the attached claims.

According to an example of an embodiment of the proposed solution, there is provided, for example, an apparatus comprising at least one processor, at least one interface to at least one other network element, and a memory for storing instructions to be executed by the processor, wherein the at least one processor comprises a communication portion configured to conduct with at least one communication network control element a communication by using a demodulation reference signal based communication mode for signals received from the at least one communication network control element, wherein the processor is further configured to generate in the demodulation reference signal based communication mode at least one predefined scrambling sequence of a demodulation reference signal, wherein each of the at least one scrambling sequence comprises a set of calculation parameters being specific for the respective scrambling sequence, wherein the set of calculation parameters is configurable during the at least one communication on the basis of configuration information received from the at least one communication network control element, wherein the communication portion is further configured to select, for initializing each of the at least one scrambling sequence before receiving the configuration information, at least one predetermined default value selectable from a set of predetermined default values for the set of calculation parameters in each of the at least one scrambling sequence.

Furthermore, according to an example of an embodiment of the proposed solution, there is provided, for example, a method comprising conducting a communication with at least one communication network control element by using a demodulation reference signal based communication mode for signals received from the, generating in the demodulation reference signal based communication mode at least one predefined scrambling sequence of a demodulation reference signal, wherein each of the at least one scrambling sequence comprises a set of calculation parameters being specific for the respective scrambling sequence, wherein the set of calculation parameters is configurable during the at least one communication on the basis of configuration information received from the at least one communication network control element, and selecting, for initializing each of the at least one scrambling sequence before receiving the configuration information, at least one predetermined default value selectable from a set of predetermined default values for the set of calculation parameters in each of the at least one scrambling sequence.

According to further refinements, these examples may comprise one or more of the following features:
the initialization of the at least one scrambling sequence may be based on $$c_{init}=(\lfloor n_s/2 \rfloor+1)\cdot(2X+1)\cdot 2^{16}+n_{SCID} \qquad (1)$$

where $c_{init}$ is the initialization code, $n_s$ is the number of the time slot, X is the calculation parameter whose value is selectable from values {x(0), x(1), ... x(N−1)} for N>1, wherein N is the number of parameters configurable for a terminal device and x(n) (0<=n<N), and $n_{SCID}$ is a number related to a serving cell identification;

the at least one predetermined default value may be determined by using an identification element of a terminal device as a parameter of a preset algorithm; for example, the identification element of the terminal device may be a radio network temporary identifier allocated to the terminal device;

the at least one default value may be determined on the basis of a physical cell identification element of a cell in which the communication is conducted;

the at least one selected predetermined default value may be used for the set of calculation parameters until a control signaling is received comprising an indication to reconfigure the set of calculation parameters to values being different to the at least one selected default value;

a selection of the at least one default value may be conducted on the basis of one of a preset instruction for the demodulation reference signal communication mode, or an information indicating which default value is to be set, the information being received via a control signaling;

the above described measure may be implemented in a communication element or terminal device, in particular a user equipment of a Long Term Evolution or Long Term Evolution Advanced communication network.

According to an example of an embodiment of the proposed solution, there is provided, for example, an apparatus comprising at least one processor, at least one interface to at least one other network element, and a memory for storing instructions to be executed by the processor, wherein the at least one processor comprises a communication control portion configured to control and conduct a communication with at least one terminal device by using a demodulation reference signal based communication mode for signals transmitted to the at least one terminal device, wherein the processor is further configured to apply in the demodulation reference signal based communication mode at least one scrambling sequence of a demodulation reference signal, wherein each of the at least one scrambling sequence comprises a set of calculation parameters for the respective scrambling sequence, wherein the set of calculation parameters is configurable during the at least one communication on the basis of configuration information transmitted to the at least one terminal device, wherein the communication control portion is further configured to use, in an initial phase of the at least one communication, at least one predetermined default value selectable from a set of predetermined default values for the set of calculation parameters before sending the configuration information.

Furthermore, according to an example of an embodiment of the proposed solution, there is provided, for example, a method comprising controlling and conducting a communication with at least one terminal device by using a demodulation reference signal based communication mode for signals transmitted to the at least one terminal device, applying in the demodulation reference signal based communication mode at least one scrambling sequence of a demodulation reference signal, wherein each of the at least one scrambling sequence comprises a set of calculation parameters for the respective scrambling sequence, wherein the set of calculation parameters is configurable during the at least one communication on the basis of configuration information transmitted to the at least one terminal device, and using, in an initial phase of the at least one communication, at least one predetermined default value selectable from a set of predetermined default values for the set of calculation parameters before sending the configuration information.

According to further refinements, these examples may comprise one or more of the following features:

in the initial phase the at least one scrambling sequence may be based on $$c_{init}=(\lfloor n_s/2 \rfloor+1) \cdot (2X+1) \cdot 2^{16}+n_{SCID} \qquad (1)$$

where $c_{init}$ is the initialization code, $n_s$ is the number of the time slot, X is the calculation parameter whose value is selectable from values $\{x(0), x(1), \ldots x(N-1)\}$ for N>1, wherein N is the number of parameters configurable for a terminal device and x(n) (0<=n<N), and $n_{SCID}$ is a number related to a serving cell identification;

the at least one predetermined default value may be determined by using an identification element of the terminal device as a parameter of a preset algorithm; for example, the identification element of the terminal device may be a radio network temporary identifier allocated to the terminal device;

the at least one predetermined default value may be determined on the basis of a physical cell identification element of a cell in which the terminal device is located;

the calculation parameter may be changed to a value being different to the default value and a control signaling may be sent to the terminal device indicating the change of the calculation parameter;

an information indicating which predetermined default value is to be used in the initial phase may be sent to the terminal device by using a control signaling;

the above described measures may be implemented in a communication network control element or base station, in particular an evolved node B of a Long Term Evolution or Long Term Evolution Advanced communication network.

In addition, according to examples of the proposed solution, there is provided, for example, a computer program product for a computer, comprising software code portions for performing the steps of the above defined methods, when said product is run on the computer. The computer program product may comprise a computer-readable medium on which said software code portions are stored. Furthermore, the computer program product may be directly loadable into the internal memory of the computer and/or transmittable via a network by means of at least one of upload, download and push procedures.

By virtue of the proposed solutions, it is possible to provide a mechanism for conducting a communication by using a DMRS based communication mode on the basis of a UE specific DMRS sequence also at an initial phase of the communication wherein overhead by extensive RRC signaling can also be avoided. Specifically, it is possible to make the DMRS fully UE specific, so the DMRS sequence generation can be decoupled from cell specific DMRS, allowing to support for example 3GPP Rel. 11 CoMP.

The above and still further objects, features and advantages of the invention will become more apparent upon referring to the description and the accompanying drawings.

DESCRIPTION OF PREFERRED EMBODIMENTS

Figure 1:
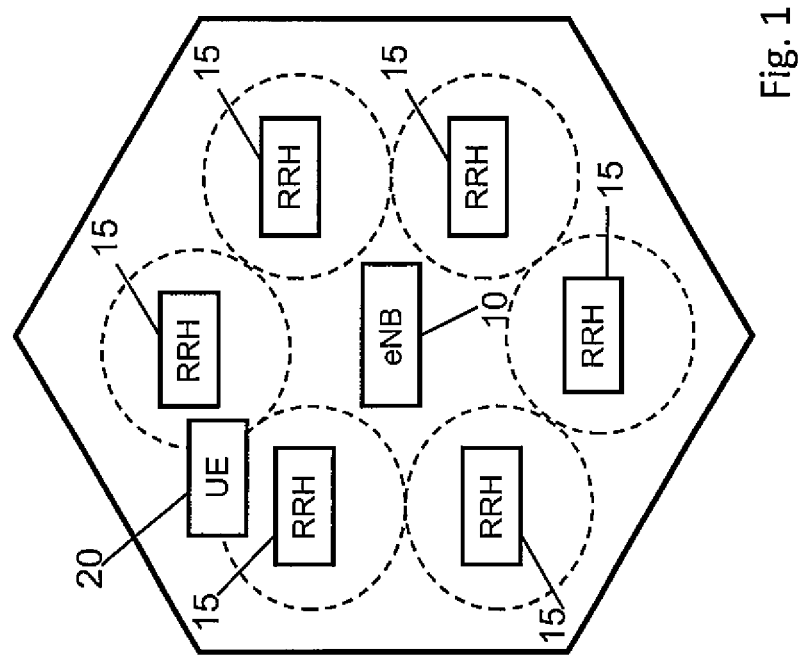
FIG. 1 shows a diagram illustrating a communication network configuration where examples of embodiments of the invention are implemented.

In the following, examples and embodiments of the present invention are described with reference to the drawings. For illustrating the present invention, the examples and embodiments will be described in connection with a cellular communication network based on a 3GPP LTE or LTE-A system. However, it is to be noted that the present invention is not limited to an application using such types of communication system, but is also applicable in other types of communication systems and the like.

A basic system architecture of a communication network where examples of embodiments of the invention are applicable may comprise a commonly known architecture of one or more communication systems comprising a wired or wireless access network subsystem and a core network. Such an architecture may comprise one or more access network control elements, radio access network elements, access service network gateways or base transceiver stations, such as a base station (BS) or eNB, which control a coverage area also referred to as a cell and with which one or more communication elements or terminal devices such as a UE or another device having a similar function, such as a modem chipset, a chip, a module etc., which can also be part of a UE or attached as a separate element to a UE, or the like, are capable to communicate via one or more channels for transmitting several types of data. Furthermore, core network elements such as gateway network elements, policy and charging control network elements, mobility management entities and the like may be comprised.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from a communication element like a UE or a communication network control element like an eNB, besides those described in detail herein below.

Furthermore, the described network elements, such as terminal devices or communication elements like UEs or communication network control elements like BSs or eNBs and the like, as well as corresponding functions as described herein may be implemented by software, e.g. by a computer program product for a computer, and/or by hardware. In any case, for executing their respective functions, correspondingly used devices, nodes or network elements may comprise several means and components (not shown) which are required for control, processing and communication/signaling functionality. Such means may comprise, for example, one or more processor units including one or more processing portions for executing instructions, programs and for processing data, memory means for storing instructions, programs and data, for serving as a work area of the processor or processing portion and the like (e.g. ROM, RAM, EEPROM, and the like), input means for inputting data and instructions by software (e.g. floppy disc, CD-ROM, EEPROM, and the like), user interface means for providing monitor and manipulation possibilities to a user (e.g. a screen, a keyboard and the like), interface means for establishing links and/or connections under the control of the processor unit or portion (e.g. wired and wireless interface means, an antenna, etc.) and the like. It is to be noted that in the present specification processing portions should not be only considered to represent physical portions of one or more processors, but may also be considered as a logical division of the referred processing tasks performed by one or more processors.

With regard to FIG. 1, a diagram illustrating a general configuration of a communication network where examples of embodiments of the invention are implemented. It is to be noted that the configuration shown in FIG. 1 shows only those devices network elements and parts which are useful for understanding principles underlying the examples of embodiments of the invention. As also known by those skilled in the art there may be several other network elements or devices involved in a connection between the communication elements (UEs) and the network which are omitted here for the sake of simplicity.

In FIG. 1, a communication network configuration is illustrated in which examples of embodiments of the invention are implementable. The network according to FIG. 1 is for example based on 3GPP LTE or LTE-A specifications and employs a CoMP architecture according to above described scenario 4. That is, the configuration is that of a heterogeneous network with low power RRHs within the macrocell coverage where the transmission/reception points created by the RRHs have the same cell IDs as the macro cell.

It is to be noted that the general functions of the elements described in connection with FIG. 1 as well as of reference points/interfaces therebetween are known to those skilled in the art so that a detailed description thereof is omitted here for the sake of simplicity. Furthermore, it is to be noted that the principles of the examples of embodiments of the present invention function also in connection with a network being based on a different configuration, such as a network employing e.g. a CoMP architecture according to one of scenarios 1 to 3, or a network using another transmission/reception mechanism being different to CoMP.

As shown in FIG. 1, in the exemplary communication network, a macrocell representing a main coverage area of a communication network control element like an eNB 10 is provided. Connected to the eNB 10, e.g. via optical fibers or the like (not shown), several low transmission power RRHs 15 having e.g. omni-antennas are provided. The RRHs 15 form respective TPs with a corresponding coverage indicated by the dashed circles. The eNB 10 is able to conduct MIMO operations, wherein users (UEs), such as UE 20, is located somewhere in the cell and can communicate with one or more TPs.

As described above, it is possible that in a DMRS communication mode the parameters used for generating the DMRS scrambling sequence can be individually configured by the eNB 10 with respective control signaling, e.g. RRC signaling. In order to save overhead caused by the per-UE RRC signaling, one approach is to use default values for calculation parameters, such as of parameter X according to equation (1).

By means of such default values, a UE 20 can generate a scrambling sequence based on e.g. equation (1) before receiving any RRC signaling for (re-)configuring the scrambling sequence. For example, the default values are set such that the most common and the most interesting communication scenarios are covered.

A first comparative example, as a possibility for setting such default values, a default value of X is set to a value which equals to a physical cell ID.

However, in such a case, in a network configuration as depicted in FIG. 1, for example (i.e. in a CoMP scenario 4), there are several TPs within one cell, i.e. there is a relative great coverage of one cell and a relative large number of UEs being located inside (i.e. more than UE 20 shown in FIG. 1), wherein all TPs share the same PCI. Hence, in case the default value for generating a DMRS sequence is decided by a physical cell ID, then one cell can only have, for example, 4 layers of MU MIMO operation (two DMRS sequences, toggled by $n_{SCID}$ in DCI, and two DMRS ports each (indicated in DCI as well)). This is however no sufficient in many cases.

On the other hand, when in the above situation the eNB 10 signal to every UE an indication to use some "virtual cell ID" or the like, e.g. by means of UE specific RRC signaling, the spatial reuse capability is greatly limited.

While in case of using a network using an architecture according CoMP scenario 1, 2 or 3, the above described number of 4 layers of MU MIMO operation may be sufficient (since each TP belongs to one cell), since the number of UE connecting to each TP/cell is limited for PDSCH, the situation may be different for other communication modes. For example, when considering a DMRS based communication mode using ePDCCH, other issues are to be considered for all CoMP scenarios. The ePDCCH may be multiplexed with other channels such as PDSCH or other ePDCCH for the same or a different UE. However, when using ePDCCH, there is no transmission of DCI beforehand which can convey the information regarding parameters for DMRS sequence generation since the ePDCCH is carrying the DCI itself. When using a default value for the DMRS sequence generation based on the physical cell ID, then limitation of ePDCCH MU is quite severe.

Therefore, according to examples of embodiments of the invention, further approaches for setting or defining default values are provided by means of which it is possible, for example, to generate a DMRS sequence which allows to keep a certain level of multi-user pairing probably (for example, two UEs can use different DMRS sequences so that pairing them is possible).

Generally, according to examples of embodiments of the invention, the terminal device, i.e. UE 20, can generate multiple DMRS sequences. Each DMRS sequence is decided separately by a set of input parameters. The input parameters (or calculation parameters) are part of an algorithm based on e.g. equation (1). Usually, i.e. in the ongoing communication, these input parameters includes at least some parameters which are configured by the eNB 10, e.g. via a corresponding control signaling like RRC signaling. However, before the signaling and hence the corresponding setting information for the parameters are received from the eNB 10, the UE 20 use some default values to generate the DMRS sequences, wherein the default settings can be kept during at least a part of the ongoing communication (i.e. an immediate reconfiguration by eNB signaling is not necessary in any case). Specifically, the UE 20 use default values for DMRS sequence initialization before receiving corresponding values which are configured by eNB. In case the UE 20 generates, for example, multiple DMRS sequences, each of these DMRS sequences has one default initialization value. At least one of the default initialization values is based on a UE ID, for example includes the UE_ID or RNTI or is calculated on the basis thereof. On the other hand, at least another default value (used for initializing another DMRS sequence) is based or includes, for example, a cell specific value, e.g. the PCI.

According to examples of embodiments of the invention, in case it is assumed that the number of calculation parameters, such as of parameter X in equation (2) which can be configured to one UE is N, then different default values are predetermined for each X and stored in the UE. For example, in case N=2, then two default parameters, such as x(0) and x(1), are predetermined and define each a separate default value.

According to examples of embodiments of the invention, at least one of the default parameters for X has a value which is decided by the UE_ID. For example, the value of a corresponding parameter X (e.g. x(1)) is a value derived by X(i)=F(UE_ID), wherein F is a preset mathematic function.

According to examples of embodiments of the invention, at least other of the default values for the calculation parameters is determined on the basis of a cell identifier, for example. That is, in case the number N is 2, for example, the default value of x(0)=PCI while the default value of x(1)=UE_ID % 504 (i.e. mod(x, 504) resulting in [0, 503]). With this two default values for the calculation parameters according to e.g. X of equation (1), in a DMRS communication mode, cell specific and UE specific DMRS sequences can be used even in the initial phase of the communication, i.e. in a time period where no control signaling such as a RRC signaling carrying configuration information has been exchanged. The initial settings may also be maintained even after such a control signaling was possible, e.g. in case the initial setting is deemed by a network controller to be proper.

In case the number of N is 3 (or even more than three), other setting options for default values are conceivable. For example, according to one example of embodiments of the invention, default values of e.g. x(0)=x(1)=PCI are set, while default value of x(2)=F(UE_ID), with F being a mathematic function or the like. Another example is represented, for example, by default values of x(0)=PCI, x(1)=F1 (UE_ID) and x(2)=F2 (UE_ID) (wherein F1 and F2 are respective different mathematic functions or the like).

According to an example of embodiments of the invention, as an UE identifier (UE_ID) a generic UE identification, such as the RNTI, or other suitable type of identification is used.

According to examples of embodiments of the invention, in case there are more than one possibilities for default values (i.e. N>1), the eNB 10 indicates which default value for the calculation parameter (e.g. x(0), x(1) etc.) is to be used by a suitable information comprised e.g. in DCI. According to further examples of embodiments of the invention, such as in case of a communication using ePDCCH DMRS, the communication is based on a default value which is preset (such as x(0)), or on a default value which is instructed from the eNB to the UE via a suitable signaling, such as a suitable RRC message. That is, for setting the correct default value, the UE 10 should use a preset x(i), wherein the value of "i" is pre-stored in a memory of the UE 10, or the like, or wherein the value if "i" is signaled via a corresponding signaling, such as a suitable RRC message.

By means of a communication mechanism according to examples of embodiments of the invention, when a default DMRS sequence is suitably selected, it can be adapted to a most common case, so that there is no immediate requirement for the network to configure a large number UEs at any time. That is, it is possible to use the default setting (i.e. DMRS sequence based on default values, for example) not only in an initial phase, but also beyond it. Furthermore, by means of using the default values (the default DMRS sequence), it is possible to conduct a DMRS based communication using a DMRS sequence also without executing a specific RRC configuration, so that the eNB 20 can already use cell specific DMRS sequence or UE specific sequence, e.g. by switching between x(0) and x(1). Hence, advantages of both 3GPP Rel. 8 DRS (generated by UE_ID) and 3GPP Rel. 10 DMRS (generated by PCI) can be obtained simultaneously.

Furthermore, by means of a communication mechanism according to examples of embodiments of the invention, by using e.g. the UE_ID for determining an default initialization value of calculation parameters (such as e.g. x(1) as indicated above), the DMRS sequences can be randomized among users. Thus, a need for using RRC signalling to update DMRS sequence allocations can be reduced. This is particular useful, for example, for eNB implementation examples where DMRS orthogonalization (same sequence, different port) is only required for SU-MIMO (while in MU-MIMO, it is safe to pair two users up with different DMRS sequence (quasi-orthogonal)). By means of the examples of embodiments of the invention, it is possible to avoid a processing where a scheduler has to carefully pair users up to prevent DMRS conflicts (i.e. a situation where two users have the same DMRS sequence and port, wherein then DMRS for two users can not be discriminated), since each UE is using a different sequence.

Figure 4:
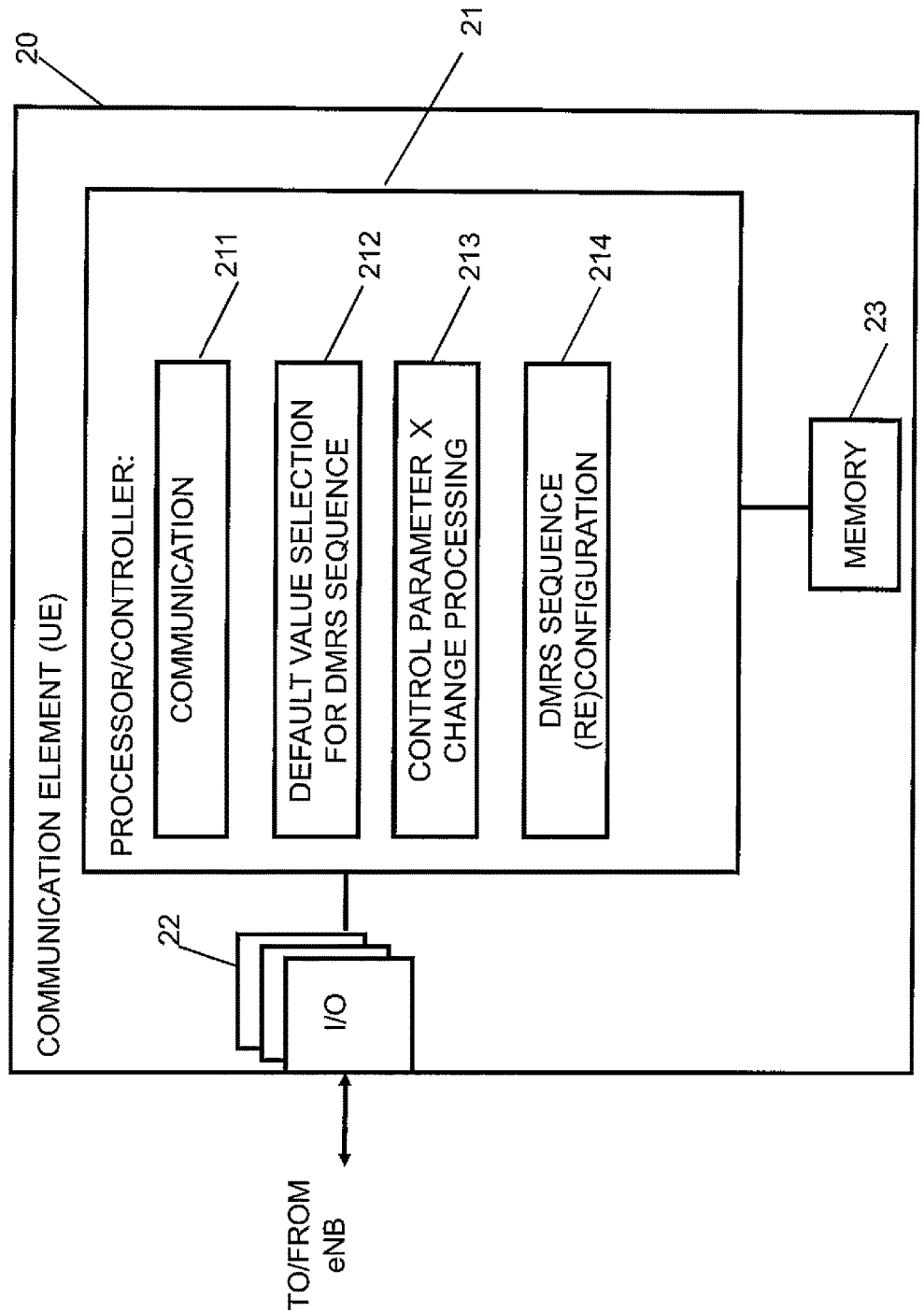
FIG. 4 shows a block circuit diagram of a communication element including processing portions conducting functions according to examples of embodiments of the invention.

FIG. 4 shows a flowchart illustrating a processing executed in a terminal device or communication element like the UE 20 of FIG. 1 according to examples of embodiments of the invention in a mechanism for conducting communications using DMRS based communication mode.

In step S10, a communication with at least one communication network control element such as eNB 10 is started to be conducted wherein a DMRS based communication mode is used. The communication is further based on CoMP as shown e.g. in FIG. 1.

In step S20, in an initial phase of the communication, the UE 20 begins to generate one or more DMRS scrambling sequences. For this purpose, a default value of calculation parameters (such as $x(0)$, $x(1)$ for parameter X of equation (1)) is selected for each generated DMRS sequence. As described above, at least one of the default values is determined on the basis of a UE_ID element, such as RNTI, of the terminal device, while another default value is based on the PCI of the cell in which the UE 20 is located, for example. The selection of the default value to be used for the respective DMRS sequence is e.g. based on a preset instruction or based on an information received from the eNB, for example (indication of "i" for selecting a respective $x(i)$).

In step S30, the DMRS sequence(s) is (are) configured by using the selected default values for the calculation parameters. Thus, the communication can be initialized.

In step S40, it is determined whether a configuration information for the DMRS sequence is received from the eNB 10, e.g. by a corresponding RRC signaling. As indicated above, the DMRS sequence(s) can be re-configured by corresponding information received from the eNB 10, e.g. during the communication.

In case the decision in step S40 is negative, the process returns to step S30 where the communication is continued by using the DMRS sequence based on the default value. Otherwise, in case a configuration information is received indicating the necessity to change the DMRS sequence (i.e. to use another calculation parameter being different to the default value), step S50 is executed where the respective DMRS sequence is reconfigured according to the changed parameter set.

That is, the UE 20 can use the default value for the calculation parameters until a control signaling is received from the eNB comprising an indication to reconfigure the calculation parameters to values being different to selected default value.

Figure 5:
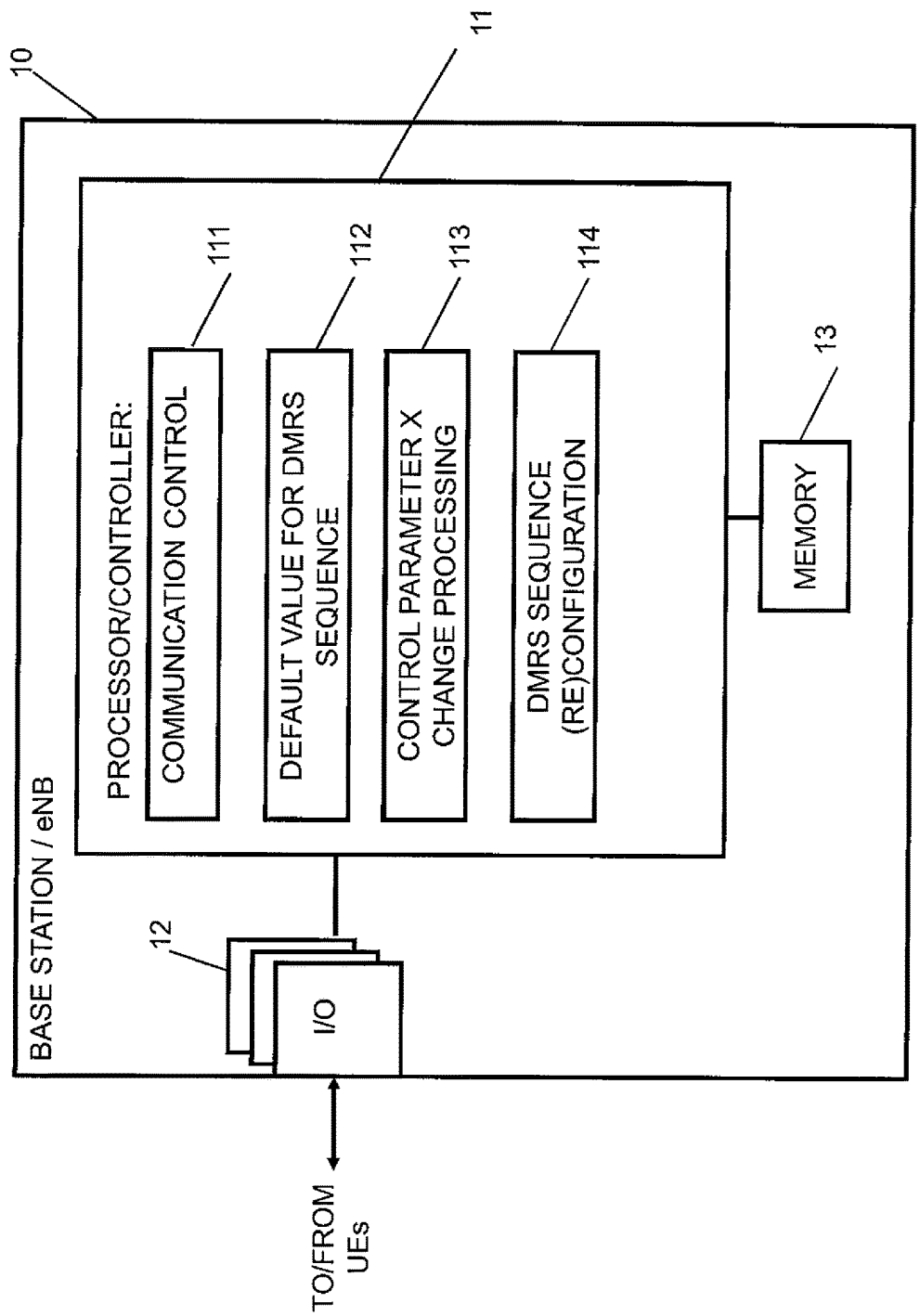
FIG. 5 shows a block circuit diagram of a communication network control element including processing portions conducting functions according to examples of embodiments of the invention.

FIG. 5 shows a flowchart illustrating a processing executed in a communication network control element like eNB 10 of FIG. 1 according to examples of embodiments of the invention in a mechanism for conducting communications using DMRS based communication mode.

In step S110, a communication with at least one communication element such as UE 20 is started to be conducted wherein a DMRS based communication mode is used. The communication is further based on CoMP as shown e.g. in FIG. 1.

In step S120, in an initial phase of the communication, the eNB 10 uses for a DMRS scrambling sequences used in the DMRS based communication mode a default value of calculation parameters (such as $x(0)$, $x(1)$ for parameter X of equation (1)) As described above, at least one of the default values is determined on the basis of a UE_ID element, such as RNTI, of the terminal device or UE 20 with which the communication is conducted, while another default value is based on the PCI of the cell, for example. The default value to be used for the DMRS sequence is e.g. selected according to a preset instruction or an information indicating the selected default value is sent to the UE 20, for example (indication of "i" for selecting a respective $x(i)$).

In step S130, the DMRS sequence(s) is (are) configured by using the selected default values for the calculation parameters. Thus, the communication can be initialized.

In step S140, it is determined that the DMRS sequence is to be reconfigured, and a corresponding calculation parameter is determined.

In step S150, a configuration information for changing the DMRS sequence is sent to the UE 20, e.g. by a corresponding RRC signaling. As indicated above, the DMRS sequence(s) can be re-configured by corresponding information received from the eNB 10, e.g. during the communication. Furthermore, the respective DMRS sequence is reconfigured according to the changed parameter set.

In FIG. 4, a block circuit diagram illustrating a configuration of a communication element or terminal device, such as of UE 20 shown in FIG. 1, is shown, which is configured to implement the processing for DMRS based communication as described in connection with the examples of embodiments of the invention. It is to be noted that the communication element or UE 20 shown in FIG. 4 may comprise several further elements or functions besides those described herein below, which are omitted herein for the sake of simplicity as they are not essential for understanding the invention. Furthermore, even though reference is made to a UE, the communication element may be also another device having a similar function, such as a modem chipset, a chip, a module etc., which can also be part of a UE or attached as a separate element to a UE, or the like.

The communication element or UE 20 may comprise a processing function or processor 21, such as a CPU or the like, which executes instructions given by programs or the like related to the above described communication mechanism using the DMRS communication mode. The processor 21 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 22 denotes transceiver or input/output (I/O) units or interfaces connected to the processor 21. The I/O units 22 may be used for communicating with elements of the access network, such as a communication network control element like eNB 10 or RRH 15. The I/O units 22 may be a combined unit comprising communication equipment towards several of the network element in question, or may comprise a distributed structure with a plurality of different interfaces for each network element in question. Reference sign 23 denotes a memory usable, for example, for storing data and programs to be executed by the processor 21 and/or as a working storage of the processor 21.

Figure 2:
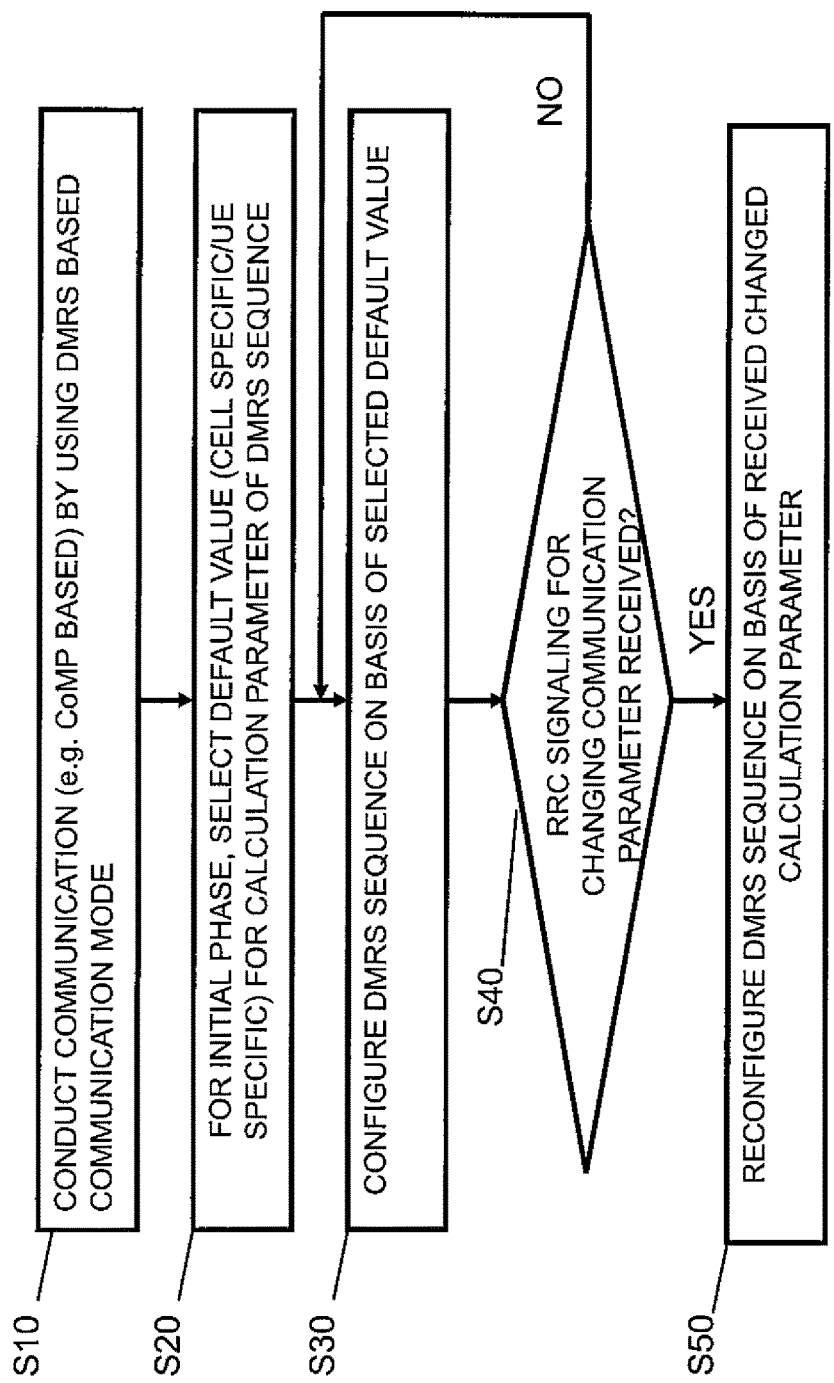
FIG. 2 shows a flowchart illustrating a processing executed in a communication element according to examples of embodiments of the invention.

The processor 21 is configured to execute processing related to the above described communication mechanism using the DMRS communication mode, for example. In particular, the processor 21 comprises a sub-portion 211 as a processing portion which is usable for establishing the communication connection (e.g. a multipoint transmission communication or the like). The portion 211 may be configured to perform processing according to step S10 according to FIG. 2, for example. Furthermore, the processor 21 comprises a sub-portion 212 as a processing portion which is usable as a portion for selecting in an initialization phase the default value for the calculation parameter(s) to be used for generating the DMRS sequence(s). The portion 212 may be configured to perform a processing according to step S20 according to FIG. 2, for example. Moreover, the processor 21 comprises a sub-portion 213 as a processing portion which is usable as a portion for conducting a calculation parameter change processing when receiving configuration information from the eNB. The portion 213 may be configured to perform processing according to steps S40 and S50 according to FIG. 2, for example. In addition, the processor 21 may comprise a sub-portion 214 as a processing portion which is usable as a portion for (re-)configuring the DMRS sequence (generation thereof). The portion 214 may be configured to perform a processing according to steps S30 and S50 according to FIG. 2, for example.

In FIG. 5, a block circuit diagram illustrating a configuration of a communication network control element, such as of eNB 10, is shown, which is configured to implement the processing for DMRS based communication as described in connection with the examples of embodiments of the invention. It is to be noted that the communication network control element or eNB 10 shown in FIG. 5 may comprise several further elements or functions besides those described herein below, which are omitted herein for the sake of simplicity as they are not essential for understanding the invention. Furthermore, even though reference is made to an eNB, the communication network element may be also another device having a similar function, such as a modem chipset, a chip, a module etc., which can also be part of a control element or BS or attached as a separate element to a BS, or the like.

The communication network control element or eNB 10 may comprise a processing function or processor 11, such as a CPU or the like, which executes instructions given by programs or the like related to the communication mechanism using the DMRS based communication mode. The processor 11 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities. Reference sign 12 denote transceiver or input/output (I/O) units (interfaces) connected to the processor 11. The I/O units 12 may be used for communicating with a communication element like UE 20. The I/O unit 12 may be a combined unit comprising communication equipment towards several network elements, or may comprise a distributed structure with a plurality of different interfaces for different network elements. Reference sign 13 denotes a memory usable, for example, for storing data and programs to be executed by the processor 11 and/or as a working storage of the processor 11.

Figure 3:
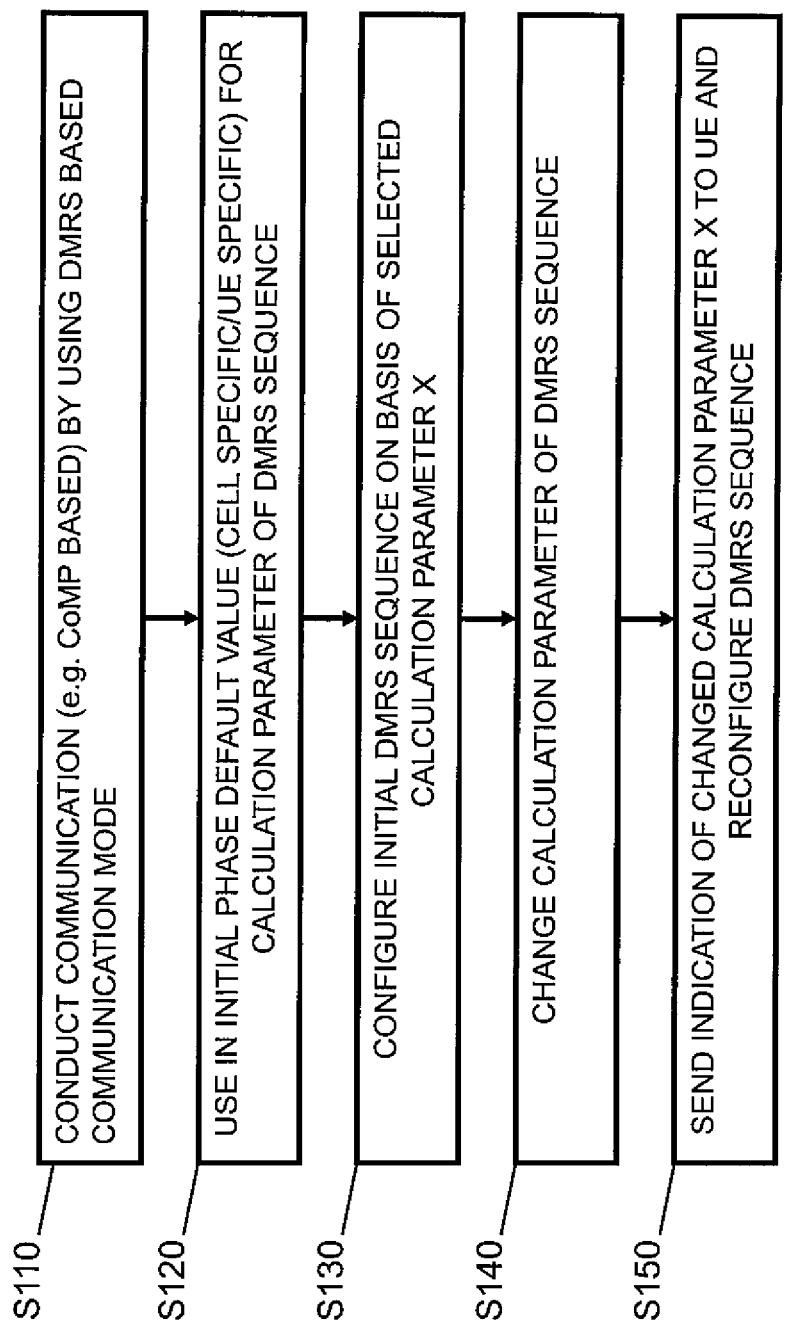
FIG. 3 shows a flowchart illustrating a processing executed in a communication network control element according to examples of embodiments of the invention.

The processor 11 is configured to execute processing related to the above described communication mechanism using the DMRS based communication mode. In particular, the processor 11 comprises a sub-portion 111 as a processing portion which is usable for establishing the communication connection (e.g. a multipoint transmission communication or the like). The portion 111 may be configured to perform processing according to step S110 according to FIG. 3, for example. Furthermore, the processor 11 comprises a sub-portion 112 as a processing portion which is usable as a portion for determining in an initialization phase the default value for the calculation parameter(s) to be used for the DMRS sequence(s). The portion 112 may be configured to perform a processing according to step S120 according to FIG. 3, for example. Moreover, the processor 11 comprises a sub-portion 113 as a processing portion which is usable as a portion for conducting a calculation parameter change processing. The portion 113 may be configured to perform processing according to steps S140 and S150 according to FIG. 3, for example. In addition, the processor 11 may comprise a sub-portion 114 as a processing portion which is usable as a portion for (re-) configuring the DMRS sequence. The portion 114 may be configured to perform a processing according to steps S130 and S150 according to FIG. 3, for example.

According to further examples of embodiments of the invention, there is provided an apparatus comprising communication means for conducting with at least one communication network control element a communication by using a demodulation reference signal based communication mode for signals received from the at least one communication network control element, and a processor for generating in the demodulation reference signal based communication mode at least one predefined scrambling sequence of a demodulation reference signal, wherein each of the at least one scrambling sequence comprises a set of calculation parameters being specific for the respective scrambling sequence, wherein the set of calculation parameters is configurable during the at least one communication on the basis of configuration information received from the at least one communication network control element, wherein the communication means further selects, for initializing each of the at least one scrambling sequence before receiving the configuration information, at least one predetermined default value selectable from a set of predetermined default values for the set of calculation parameters in each of the at least one scrambling sequence.

Furthermore, according to examples of embodiments of the invention, there is provided an apparatus comprising communication control means for controlling and conducting a communication with at least one terminal device by using a demodulation reference signal based communication mode for signals transmitted to the at least one terminal device, and a processor for applying in the demodulation reference signal based communication mode at least one scrambling sequence of a demodulation reference signal, wherein each of the at least one scrambling sequence comprises a set of calculation parameters for the respective scrambling sequence, wherein the set of calculation parameters is configurable during the at least one communication on the basis of configuration information transmitted to the at least one terminal device, wherein the communication control means uses, in an initial phase of the at least one communication, at least one predetermined default value selectable from a set of predetermined default values for the set of calculation parameters before sending the configuration information.

For the purpose of the present invention as described herein above, it should be noted that an access technology via which signaling is transferred to and from a network element may be any technology by means of which a network element or sensor node can access another network element or node (e.g. via a base station or generally an access node). Any present or future technology, such as WLAN (Wireless Local Access Network), WiMAX (Worldwide Interoperability for Microwave Access), LTE, LTE-A, Bluetooth, Infrared, and the like may be used; although the above technologies are mostly wireless access technologies, e.g. in different radio spectra, access technology in the sense of the present invention implies also wired technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto, usable communication networks, stations and transmission nodes may be or comprise any device, apparatus, unit or means by which a station, entity or other user equipment may connect to and/or utilize services offered by the access network; such services include, among others, data and/or (audio-) visual communication, data download etc.;

a user equipment or communication network element (station) may be any device, apparatus, unit or means by which a system user or subscriber may experience services from an access network, such as a mobile phone or smart phone, a personal digital assistant PDA, or computer, or a device having a corresponding functionality, such as a modem chipset, a chip, a module etc., which can also be part of a UE or attached as a separate element to a UE, or the like;

method steps likely to be implemented as software code portions and being run using a processor at a network element or terminal (as examples of devices, apparatuses and/or modules thereof, or as examples of entities including apparatuses and/or modules for it), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, apparatuses, units or means likely to be implemented as hardware components at a terminal or network element, or any module(s) thereof, are hardware independent and can be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved; for example, for executing operations and functions according to examples of embodiments of the invention, one or more processors may be used or shared in the processing, or one or more processing sections or processing portions may be used and shared in the processing, wherein one physical processor or more than one physical processor may be used for implementing one or more processing portions dedicated to specific processing as described, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

As described above, there is provided a mechanism for conducting a communication between at least one communication network control element such as an eNB and at least one communication element such as a UE wherein a DM RS based communication mode is used. DMRS (scrambling) sequences are generated wherein each DMRS sequence comprises a set of calculation parameters being specific for the respective DMRS sequence, wherein the set of calculation parameters is configurable by the eNB during communication. For initializing each of the at least one scrambling sequence before receiving the configuration information, i.e. in an initial phase of the communication, a predetermined default value based on e.g. an UE_ID and being selectable from a set of predetermined default values is used for the set of calculation parameters in each DMRS sequence.

Although the present invention has been described herein before with reference to particular embodiments thereof, the present invention is not limited thereto and various modifications can be made thereto.

What is claimed is:

1. An apparatus comprising:
   at least one processor; and
   at least one memory including computer program code, the at least one memory and the computer program code configured, with the at least one processor, to cause the apparatus to perform at least the following:
   to conduct with at least one communication network control element a communication by using a demodulation reference signal based communication mode for signals received from the at least one communication network control element;
   to generate in the demodulation reference signal based communication mode at least one predefined scrambling sequence of a demodulation reference signal,
      wherein each of the at least one scrambling sequence comprises a set of calculation parameters being specific for the respective scrambling sequence,
      wherein the set of calculation parameters is configurable during the at least one communication on the basis of configuration information received from the at least one communication network control element; and
   to select, for initializing each of the at least one scrambling sequence before receiving the configuration information, at least one predetermined default value selectable from a set of predetermined default values for the set of calculation parameters in each of the at least one scrambling sequence, wherein the at least one predetermined default value is determined by using an identification element identifier of a terminal device as a parameter of a preset algorithm.

2. The apparatus according to claim 1, wherein the initialization of the at least one scrambling sequence is based on $$c_{init}(\lfloor n_s/2 \rfloor + 1) \cdot (2X+1) \cdot 2^{16} + n_{SCID}$$

where $C_{init}$ is the initialization code, $n_s$ is the number of the time slot, X is the calculation parameter whose value is selectable from values $\{x(0), x(1), \ldots x(N-1)\}$ for N>1, wherein N is the number of parameters configurable for a terminal device and $x(n)$ (0<=n<N), and $n_{SCID}$ is a number related to a serving cell identification.

3. The apparatus according to claim 1, wherein the at least one default value is determined on the basis of a physical cell identification element of a cell in which the communication is conducted.

4. The apparatus according to claim 1, and the at least one memory and the computer program code configured, with the at least one processor, to cause the apparatus further to use the at least one selected predetermined default value for the set of calculation parameters until a control signaling is received comprising an indication to reconfigure the set of calculation parameters to values being different to the at least one selected default value.

5. The apparatus according to claim 1, and the at least one memory and the computer program code configured, with the at least one processor, to cause the apparatus further to select the at least one default value on the basis of one of
   a preset instruction for the demodulation reference signal communication mode, or
   an information indicating which default value is to be set, the information being received via a control signaling.

6. A method comprising
   conducting a communication with at least one communication network control element by using a demodulation reference signal based communication mode for signals received from the at least one communication network control element;
   generating in the demodulation reference signal based communication mode at least one predefined scrambling sequence of a demodulation reference signal,
      wherein each of the at least one scrambling sequence comprises a set of calculation parameters being specific for the respective scrambling sequence,
      wherein the set of calculation parameters is configurable during the at least one communication on the basis of configuration information received from the at least one communication network control element; and
   selecting, for initializing each of the at least one scrambling sequence before receiving the configuration information, at least one predetermined default value selectable from a set of predetermined default values for the set of calculation parameters in each of the at least one scrambling sequence, wherein the at least one predetermined default value is determined by using an identification element identifier of a terminal device as a parameter of a preset algorithm.

7. An apparatus comprising:
   at least one processor; and
   at least one memory including computer program code, the at least one memory and the computer program code configured, with the at least one processor, to cause the apparatus to perform at least the following:
   to control and conduct a communication with at least one terminal device by using a demodulation reference signal based communication mode for signals transmitted to the at least one terminal device;
   to apply in the demodulation reference signal based communication mode at least one scrambling sequence of a demodulation reference signal,
      wherein each of the at least one scrambling sequence comprises a set of calculation parameters for the respective scrambling sequence,
      wherein the set of calculation parameters is configurable during the at least one communication on the basis of configuration information transmitted to the at least one terminal device; and
   to use, in an initial phase of the at least one communication, at least one predetermined default value selectable from a set of predetermined default values for the set of calculation parameters before sending the configuration information, wherein the at least one predetermined default value is determined by using an identification element identifier of a terminal device as a parameter of a preset algorithm.

8. The apparatus according to claim 7, wherein in the initial phase the at least one scrambling sequence is based on $$c_{init} = (\lfloor n_s/2 \rfloor + 1) \cdot (2X+1) \cdot 2^{16} + n_{SCID} \quad (1)$$

where $C_{init}$ is the initialization code, $n_s$ is the number of the time slot, X is the calculation parameter whose value is selectable from values $(x(0), x(1)_f \ldots x(N-1)\}$ for N>1, wherein N is the number of parameters configurable for a terminal device and $x(n)$ (0<=n<N), and $n_{SCID}$ is a number related to a serving cell identification.

9. The apparatus according to claim 7, wherein the at least one predetermined default value is determined on the basis of a physical cell identification element of a cell in which the terminal device is located.

10. The apparatus according to claim 7 and the at least one memory and the computer program code configured, with the at least one processor, to cause the apparatus further to change the calculation parameter to a value being different to the default value and to send a control signaling to the terminal device indicating the change of the calculation parameter.

11. The apparatus according to claim 7, and the at least one memory and the computer program code configured, with the at least one processor, to cause the apparatus further to send an information indicating which predetermined default value is to be used in the initial phase to the terminal device by using a control signaling.

12. A method comprising
   controlling and conducting a communication with at least one terminal device by using a demodulation reference signal based communication mode for signals transmitted to the at least one terminal device;
   applying in the demodulation reference signal based communication mode at least one scrambling sequence of a demodulation reference signal,
      wherein each of the at least one scrambling sequence comprises a set of calculation parameters for the respective scrambling sequence,
      wherein the set of calculation parameters is configurable during the at least one communication on the basis of configuration information transmitted to the at least one terminal device; and using, in an initial phase of the at least one communication, at least one predetermined default value selectable from a set of predetermined default values for the set of calculation parameters before sending the configuration information, wherein the at least one predetermined default value is determined by using an identification element identifier of a terminal device as a parameter of a preset algorithm.

13. A computer program product comprising a non-transitory computer-readable storage medium bearing computer program code embodied therein for use with a computer, the computer program code comprising code for performing or controlling the following:

conducting a communication with at least one communication network control element by using a demodulation reference signal based communication mode for signals received from the at least one communication network control element;

generating in the demodulation reference signal based communication mode at least one predefined scrambling sequence of a demodulation reference signal, wherein each of the at least one scrambling sequence comprises a set of calculation parameters being specific for the respective scrambling sequence, wherein the set of calculation parameters is configurable during the at least one communication on the basis of configuration information received from the at least one communication network control element; and selecting, for initializing each of the at least one scrambling sequence before receiving the configuration information, at least one predetermined default value selectable from a set of predetermined default values for the set of calculation parameters in each of the at least one scrambling sequence, wherein the at least one predetermined default value is determined by using an identification element identifier of a terminal device as a parameter of a preset algorithm.

* * * * *